(12) United States Patent
Malaga et al.

(10) Patent No.: US 8,767,815 B2
(45) Date of Patent: Jul. 1, 2014

(54) PARALLEL-FREQUENCY PARTIALLY-COHERENT RECEPTION OF PULSE-POSITION MODULATED ADS-B MESSAGES

(71) Applicant: Honeywell International Inc., Morristown, MN (US)

(72) Inventors: Alfonso Malaga, Sammamish, WA (US); Jamal Haque, Clearwater, FL (US); Andrew White, Sarasota, FL (US)

(73) Assignee: Honeywell International Inc., Morristown, NJ (US)

( * ) Notice: Subject to any disclaimer, the term of this patent is extended or adjusted under 35 U.S.C. 154(b) by 62 days.

(21) Appl. No.: 13/689,874

(22) Filed: Nov. 30, 2012

(65) Prior Publication Data

US 2014/0153632 A1    Jun. 5, 2014

(51) Int. Cl.
*H03K 9/08* (2006.01)
(52) U.S. Cl.
USPC .......................................... 375/239; 375/240
(58) Field of Classification Search
CPC .................................................. H04B 7/18506
USPC ....................................................... 375/239
See application file for complete search history.

(56) References Cited

U.S. PATENT DOCUMENTS

| | | | | |
|---|---|---|---|---|
| 4,621,365 A | * | 11/1986 | Chiu | 375/149 |
| 6,111,911 A | * | 8/2000 | Sanderford et al. | 375/147 |
| 6,608,863 B1 | * | 8/2003 | Onizawa et al. | 375/232 |
| 7,787,513 B2 | * | 8/2010 | Siwiak et al. | 375/130 |
| 7,830,989 B2 | * | 11/2010 | Mohamadi | 375/343 |
| 8,427,892 B2 | * | 4/2013 | Venkataraman et al. | 365/193 |
| 2011/0215960 A1 | * | 9/2011 | Stevens et al. | 342/37 |
| 2012/0112950 A1 | * | 5/2012 | Hovey | 342/29 |
| 2012/0162014 A1 | * | 6/2012 | Wu et al. | 342/387 |
| 2013/0082867 A1 | * | 4/2013 | Malaga | 342/40 |

OTHER PUBLICATIONS

Cui et al., "Pseudocoherent Detection of OOK/PPM Signals as Zero-Delay Transmitted-Reference Signals with Bandpass Downsampling for UWB Communications", "IEEE Transactions on Vehicular Technology", Oct. 2009, pp. 4141-4148, vol. 58, No. 8.
Divsalar et al, "Pseudo-Coherent Demodulation for Mobile Satellite Systems", Jan. 1993, pp. 491-498.

(Continued)

*Primary Examiner* — Santiago Garcia
(74) *Attorney, Agent, or Firm* — Fogg & Powers LLC

(57) ABSTRACT

One embodiment is directed towards an RF receiver for receiving a pulse-position modulated signal transmitted with a 1090 MHz ADS-B transmitter, wherein the pulse-position modulated signal is preceded by a preamble of 4 pulses that conform to an ADS-B protocol. The receiver can filter a digital sample stream with a filter matched to pulses in an earlier half of an expected preamble sequence to produce a first matched filter output sample stream. The receiver can also filter the digital sample stream with a filter matched to a pulses in a latter half of the expected preamble sequence to produce a second matched filter output sample stream. The receiver can determine that a sequence of pulses match the expected preamble sequence based on when the first matched filter output sample stream and the second matched filter output sample stream are above a minimum trigger level at the same time.

20 Claims, 10 Drawing Sheets

(56) References Cited

OTHER PUBLICATIONS

Osborne et al., "Coherent and Noncoherent Detection of CPFSK", Oct. 4, 1973, pp. 1023-1036, Publisher: IEEE.

"Minimum Operational Performance Standards for 1090 MHz Extended Squitter Automatic Depedent Surveillance-Broadcast (ADS-B) and Traffic Information Services-Broadcast (TIS-B)", Dec. 2, 2009, pp. 1-44, Publisher: RTCA, Inc.

Seagraves et al., "Robust Mobile Wimax Preamble Detection", Nov. 2008, pp. 1-7, Publisher: Digital Receiver Technology, Inc.

Haque et al., "Systems and Methods for Receiving Aircraft Position Reports", "U.S. Appl. No. 13/316,052", Dec. 9, 2011, pp. 1-37.

\* cited by examiner

PARALLEL-FREQUENCY PARTIALLY-COHERENT RECEPTION OF PULSE-POSITION MODULATED ADS-B MESSAGES

BACKGROUND

Automatic Dependent Surveillance-Broadcast (ADS-B) is an international aviation system recently defined and implemented where aircraft use GPS information to determine their position and broadcast it in short (112 bit) bursts of 120 microseconds duration transmitted at nominal 1 second intervals. The frequency used to transmit the messages, 1090 MHz, is the same frequency used by aircraft transponders to respond to interrogations from ground based surveillance radars or interrogations from airborne collision avoidance systems (TCAS/ACAS). The ADS-B transmissions may be monitored by other aircraft equipped with ADS-B IN receivers or by ground stations within up to 100 NM range to acquire, track, and display the location of other aircraft.

SUMMARY

One embodiment is directed towards an RF receiver for receiving a pulse-position modulated signal transmitted with a 1090 MHz ADS-B transmitter, wherein the pulse-position modulated signal is preceded by a preamble of 4 pulses that conform to an ADS-B protocol. The receiver can filter a digital sample stream with a filter matched to pulses in an earlier half of an expected preamble sequence to produce a first matched filter output sample stream. The receiver can also filter the digital sample stream with a filter matched to a pulses in a latter half of the expected preamble sequence to produce a second matched filter output sample stream. The receiver can determine that a sequence of pulses match the expected preamble sequence based on when the first matched filter output sample stream and the second matched filter output sample stream are above a minimum trigger level at the same time.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
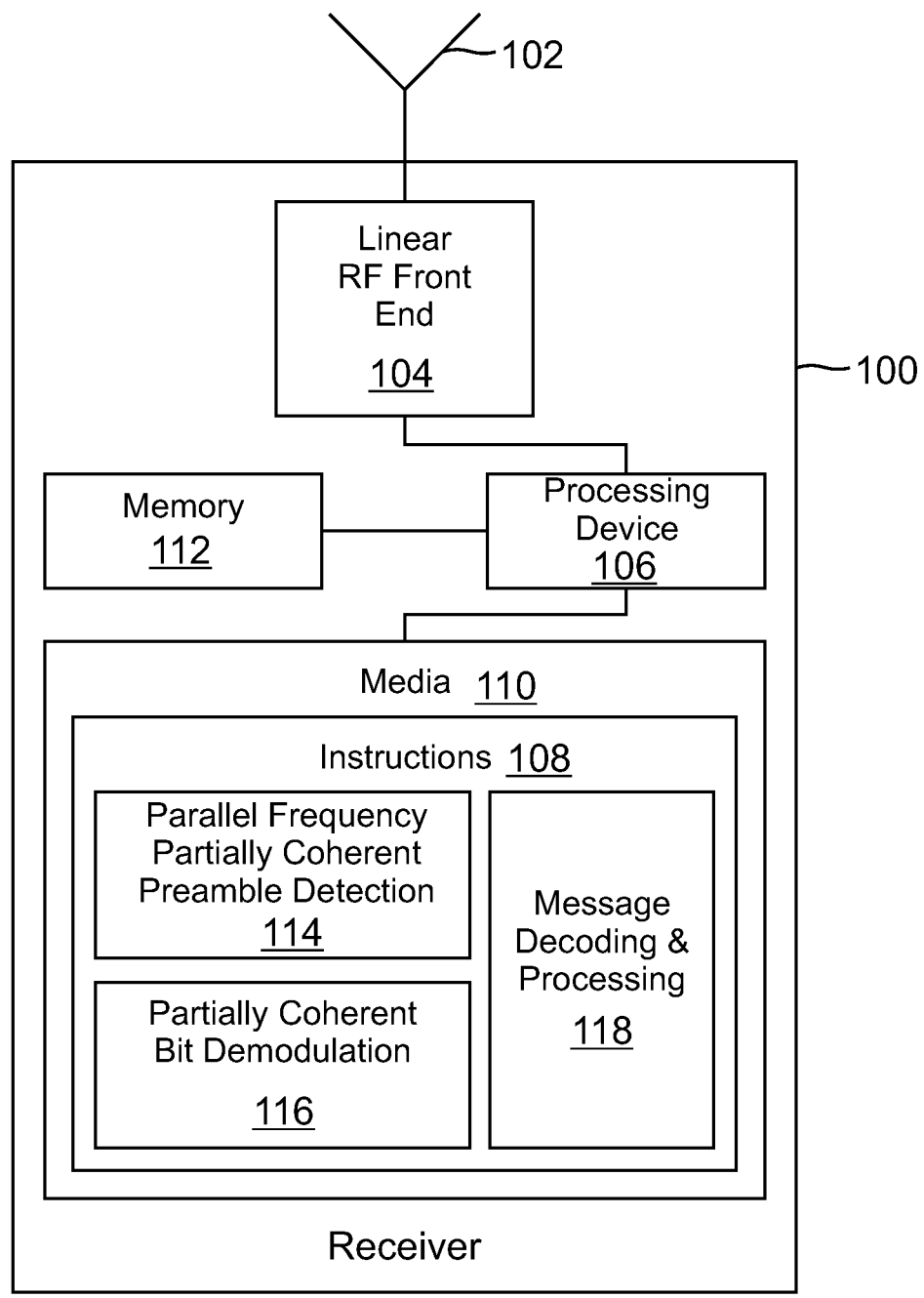
FIG. 1 is a block diagram of an example radio frequency (RF) receiver implementing parallel-frequency partially coherent preamble detection and partially coherent binary pulse-position bit demodulation of 1090 MHz ADS-B messages.

In accordance with common practice, the various described features are not drawn to scale but are drawn to emphasize specific features relevant to the exemplary embodiments.

DETAILED DESCRIPTION

More recently, there has been strong interest to implement a space-based surveillance system where ADS-B receivers installed in low earth orbit (LEO) satellites would receive the ADS-B transmissions from aircraft flying in oceanic and remote areas where surface radar surveillance is not available. The space-based surveillance system with on-board processing capabilities would decode, demodulate, and relay the ADS-B messages to Air Navigation Service Providers. However, because the LEO satellites are at distances 7-14 times farther away than typical aircraft ADS-B IN receivers, the satellites need to be able to receive much weaker ADS-B signals.

The sensitivity of a typical ADS-B IN receiver is currently limited by the requirements in RTCA-DO-260B which requires that the receivers be able to receive ADS-B messages from aircraft transmissions on the assigned 1090 MHz frequency +/−1 MHz. The ADS-B transmissions consist of a 112 bit message of 112 microseconds duration transmitted as a sequence of 112 pulses, each with 2 MHz bandwidth (0.5 microsecond duration) using binary pulse-position modulation. The message is preceded by a 4 pulse preamble sent over an 8 microsecond interval preceding the message. Because of the +/−1 MHz frequency uncertainty the state-of-the-art receivers employ a pulse detection bandwidth of 4 MHz to receive the pulses of 2 MHz bandwidth. Furthermore, because ADS-B IN receivers must be able to receiver ADS-B IN messages from nearby as well as from far away aircraft, the receivers must have a large dynamic range. Consequently, the receivers employ logarithmic receiver-detectors and non-coherent preamble detection and bit demodulation techniques that use amplitude information only. These together with the 4 MHz detection bandwidth limit the sensitivity of the receiver.

The embodiments described below relate to methods and receivers for receiving messages with short preambles and unknown center/carrier frequency where the center/carrier frequency of the received signal is equal to or greater than the bandwidth of the signal and where the message bits are binary pulse-position modulated signals as is the case for the 1090 MHz ADS-B system signals. Such methods and receivers can be used in space-based ADS-B surveillance applications as well as standard aviation ADS-B In receivers. Such methods and receivers use a linear receiver that provides amplitude and phase information or in-phase and quadrature signals for preamble detection and message bit demodulation signal processing. Implementation of a linear receiver in space applications is easier than in terrestrial applications since the ADS-B signals received at a satellite are all weak and exhibit a lower dynamic range than the terrestrial application. The amplitude and phase information is used in combination with parallel multi-frequency preamble detection signal processing techniques to resolve the frequency uncertainty of +/−1 MHz. The resolved frequency uncertainty is used to correct the frequency error making it possible to employ a detection bandwidth of 2 MHz matched to the bandwidth of the pulses instead of the 4 MHz bandwidth employed by log-amp receivers. This results in a greater signal-to-noise ratio. The methods and receivers also use partially coherent preamble detection and pulse-position bit demodulation to further improve the sensitivity of the receiver. The use of such techniques and the higher signal to noise ratio afforded by the smaller detection bandwidth make it possible to achieve receiver sensitivities 3 to 5 dB better than the sensitivity of a conventional ADS-B log-amp detector receiver.

FIG. 1 is a block diagram of an example radio frequency (RF) receiver 100 implementing partially coherent preamble detection of 1090 MHz ADS-B messages followed by partially coherent demodulation of the binary pulse-position modulated message bits. The receiver 100 includes an antenna 102 to sense RF signals. In an example, the antenna 102 is a spot beam antenna configured to sense 1090 MHz signals. An RF front end 104 including appropriate electronic components is coupled to the antenna 102. The RF front end 104 is linear and is configured to digitally sample the RF signal sensed by the antenna 102 to output a digital sample stream. The digital sample stream is comprised of complex samples including amplitude and phase information. One or more programmable processors 106 are coupled to the RF front end 104 and are configured to receive the digital sample stream. The one or more processing devices 106 can include any suitable programmable processor such as a microprocessor (e.g., a digital signal processors (DSP)), microcontroller, field programmable gate array (FPGA), and others. The one or more processing devices 106 are configure to implement instructions 108. The instructions 108 are stored (or otherwise embodied) on or in an appropriate storage medium or media 110 (such as flash or other non-volatile memory) from which the instructions are readable by the processing device(s) 106. A memory 112 can also be included that is coupled to the processing device(s) 106 for temporary storage of the instructions 108. Memory 208 comprises, in one implementation, any suitable form of random access memory (RAM) now known or later developed, such as dynamic random access memory (DRAM). In other implementations, other types of memory are used.

The instructions 108 are configured to implement three functions for the receiver 100 and, as such, are described herein as three "modules". A first module 114 is configured to implement parallel partially coherent preamble detection at a multiplicity of frequency offsets that span the range of frequency uncertainty of the received signal to detect a known preamble in the digital sample stream from the RF front end 104. A second module 116 is configured to implement partially coherent bit demodulation of a message portion following a preamble detected by the preamble detection module 114. The demodulation module 116 outputs digital bits (e.g., 1s and 0s) to a third module 118 that is configured to implement message decoding and processing of bits to identify the message therein. The third module 118 can be implemented in any desired manner.

Figure 2:
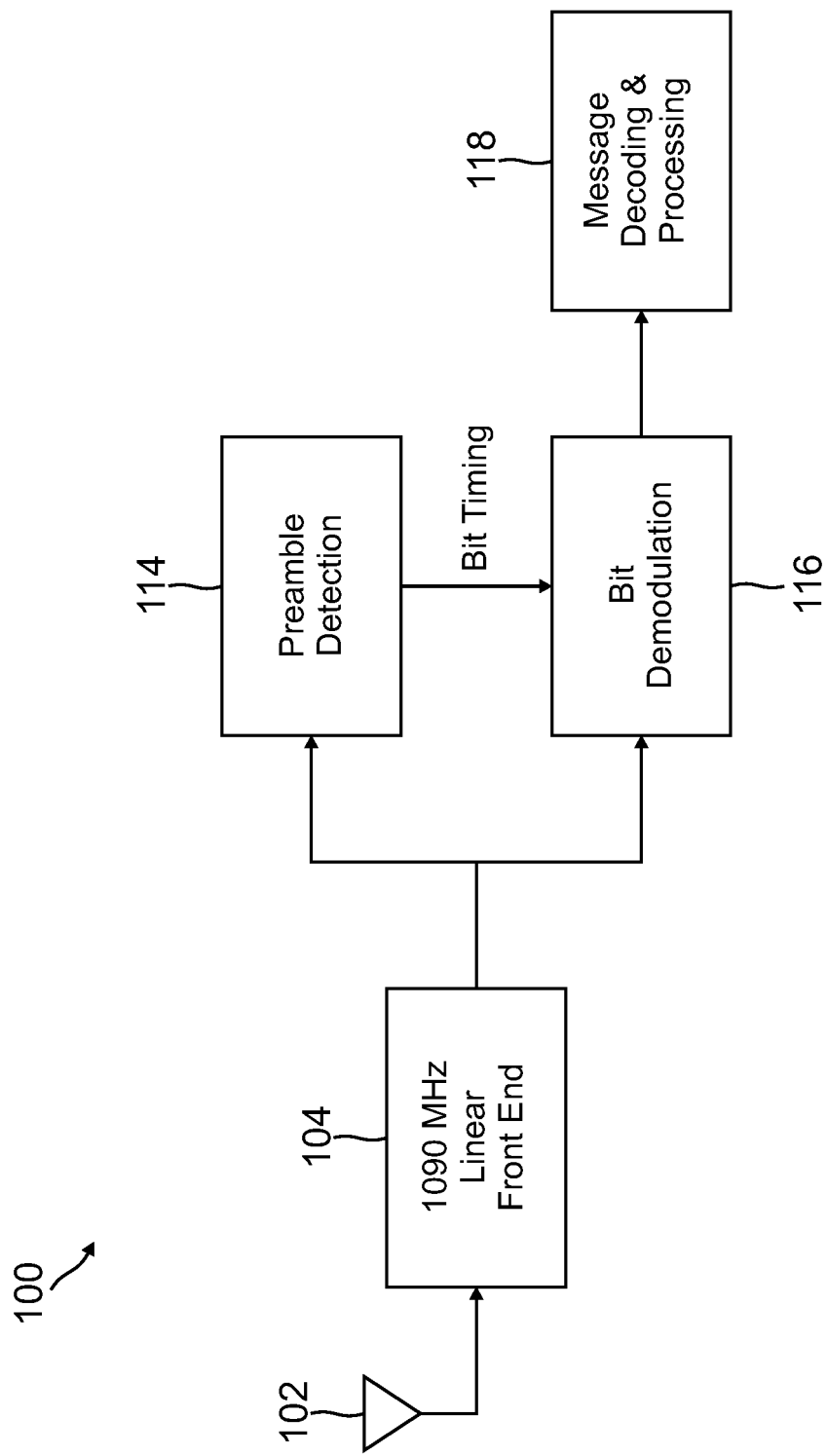
FIG. 2 is a block diagram of an example of the functional interaction between software modules and a front end of the receiver of FIG. 1.

FIG. 2 is a block diagram of an example of the functional interaction between the modules 114, 116, 118 and the front end 104 of the receiver 100. The front end 104 receives signals sensed by the antenna 102 and generates digital RF samples forming a digital sample stream from the signals. The preamble detection module 114 and the bit demodulation module 116 both operate on the digital sample stream from the front end 104. The preamble detection module 114 continually detects for a known preamble (i.e., a pre-defined sequence of pulses) in the digital sample stream. When such a preamble is identified, the preamble detection module 114 notifies the bit demodulation module 116 that a preamble has been detected and provides the bit demodulation module 116 with the timing at which the preamble was detected. Once a preamble has been identified by the preamble detection module 114, the bit demodulation module 116 demodulates a payload (message) portion the digital sample stream that follows the preamble. The bit demodulation module 116 uses the timing from the preamble detection module 114 to synchronize the demodulation. Demodulation of the payload portion by the bit demodulation module 116 produces a digital bit stream (i.e., 1s and 0s). The message decoding and processing module 118 processing the digital bit stream to identify the message therein.

Figure 3:
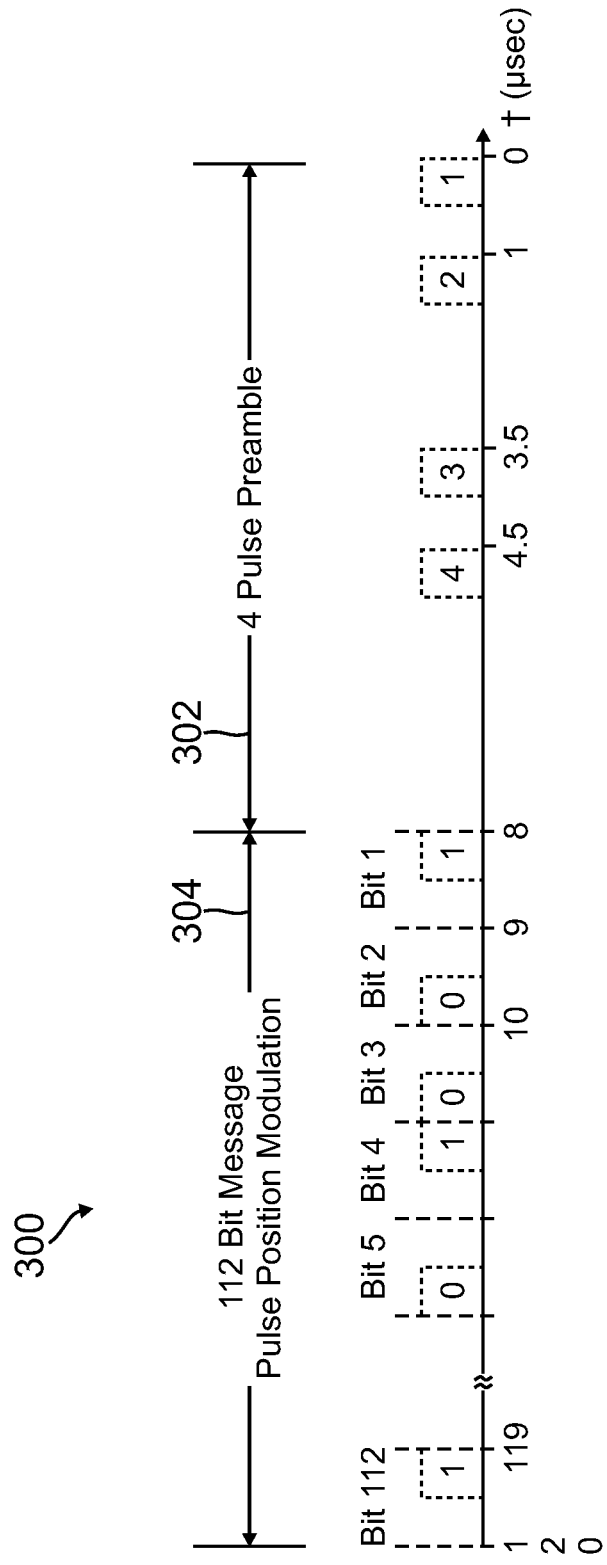
FIG. 3 is a block diagram of the format of the 4-pulse preamble and binary pulse-position modulated encoding of the 112-bit ADS-B messages that can be received by the receiver of FIG. 1.

FIG. 3 is a block diagram of the format of the 4-pulse preamble and an example binary pulse-position modulated encoding of a 112-bit ADS-B message 300 that can be received by the receiver 100. As known, a pulse position modulated signal comprises a plurality of pulses, where the timing (i.e., position) of each pulse within a symbol interval of duration $2^M$ greater than the pulse duration, where M is the number of bits per symbol, indicates the bit conveyed by the pulse. In particular, the signal is comprised of a plurality of symbols each symbol including a single pulse, where the position (timing) of the pulse within the symbol indicates the bit conveyed by the pulse. In the example described herein each symbol of the pulse-position modulated signal 300 is of 1 microsecond duration and has two possible pulse positions (M=1), where a pulse is in the first position (e.g., a first half of the symbol) indicates a 1 and a pulse in the second position (e.g., the second half of the symbol) indicates a 0. In an example, the pulse position modulated signal 300 is a 1090 MHz signal configured in compliance with the Automatic Dependent Surveillance-Broadcast (ADS-B) international aviation system.

The pulse-position modulated signal 300 illustrated in FIG. 3 includes a preamble portion 302 and a payload (message) portion 304. The preamble 302 includes a predefined sequence of pulses that precede each message 304. The preamble 302 is used by the receiver 100 to identify a message 304 and for received message timing and frequency resolution to aid in the bit demodulation of the received message 304. In this example, the receiver 100 is configured to identify preambles comprised of four pulses that are spaced such that the second pulse is 1 microsecond after a first pulse, the third pulse is 3.5 microseconds after the first pulse, and the fourth pulse is 4.5 microseconds after the first pulse. When such a preamble 302 is detected, the receiver 100 is configured to demodulate and decode a message with the first symbol beginning 8 microseconds after the first pulse of the preamble. The message contains 112 bits and, accordingly, 112 symbols.

Figure 4:
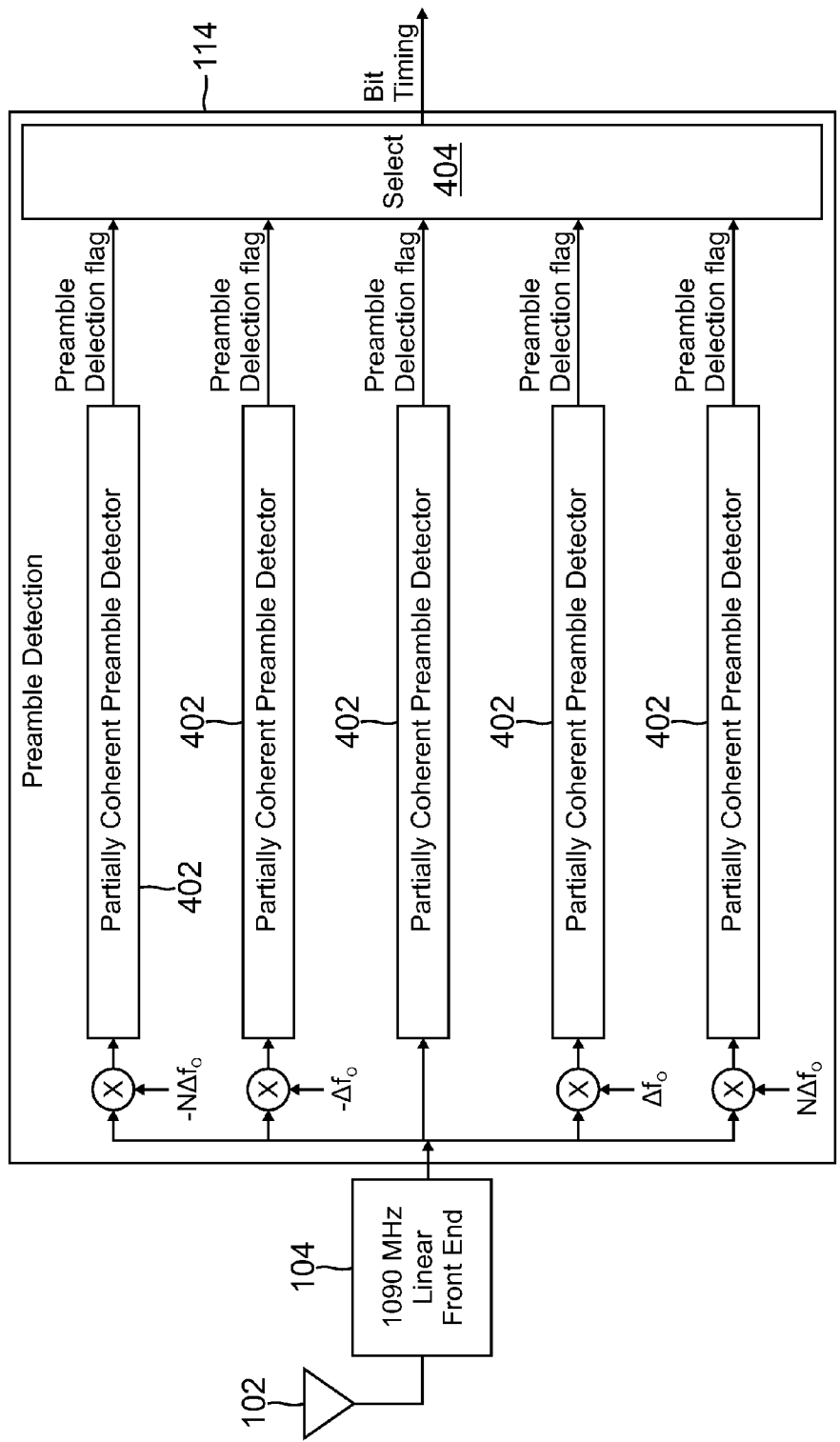
FIG. 4 is a block diagram of an example of the functional procedures implemented by a preamble detector capable of receiving ADS-B messages with unknown center/carrier frequency in the range between 1089 MHz and 1091 MHz.

FIG. 4 is a block diagram of an example of the functional procedures implemented by a preamble detection module 114 capable of receiving ADS-B messages with unknown center/carrier frequency in the range between 1089 MHz and 1091 MHz. The preamble detector module 114 is a multi-frequency preamble detector that is configured to detect for a preamble over several different frequency ranges simultaneously. To accomplish this, the preamble detection module 114 includes a plurality of partially coherent preamble detectors 402, where each partially coherent preamble detector 402 operates on the digital sample stream at a different frequency offset. The frequency offsets $m\Delta f_0$, $m=-M, \ldots, -2, -1, 0, 1, 2, \ldots, M$, that span the range of frequency uncertainty of the received signal, e.g. ±1 MHz, with a resolution (granularity) $\Delta f_0$ equal to the maximum tolerable frequency error, e.g. 200 kHz. The example shown in FIG. 4 includes 5 preamble detectors 402; however, other examples can include more or fewer preamble detectors 402. A first preamble detector 402 operates on a version of the digital sample stream that is shifted in frequency by $-2\Delta f_0$, a second preamble detector 402 operates on a version of the digital sample stream that is shifted by $-\Delta f_0$, a third preamble detector 402 operates on a version of the digital sample stream that is not shifted, a fourth preamble detector 402 operates on a version that is shifted by $\Delta f_0$, and a fifth preamble detector 402 operates on a version that is shifted by $2\Delta f_0$. Each preamble detector 402 outputs an indication of whether a sequence of pulses is received matching the preamble 302 to the selector 404. The indication also includes an indication of the power level of the peaks in Y1(k) and Y2(k) (discussed below) and may include phase information. When a sequence of pulses matching the preamble 302 is received, it is likely that multiple preamble detectors 402 will indicate a match. If so, the selector 404 selects the indication from the preamble detector 402 that measured the largest power level for peaks Y1(k) and Y2(k) and outputs that indication to the bit demodulation module 116. Based on the frequency offset, or lack thereof, of the digital sample stream processed by the selected preamble detector 402, the frequency of the received signal at the antenna 102 can be determined. If, for example, the signal received at the antenna 102 is 1090 MHz. Then the preamble detector 402 operating on the un-shifted version of the digital sample stream should receive the largest power levels. If the preamble detector 114 operating on the digital sample stream that is shifted $\Delta f_0$ receives the largest power, that indicates that the received signal at the antenna 102 was $\Delta f_0$ above 1090 Mhz. The number of preamble detectors 402 used can be based on the desired resolution in determining the frequency of the signal at the antenna 102. In an example, the bandwidth implemented by the coefficients, w(0)-w(N-1) of each preamble detector 402 is equal to the pulse bandwidth. By using additional parallel preamble detectors 402, the bandwidth of each can be reduced (as compared to the single preamble detector) since adjacent detectors 402 should receive signals at frequencies outside the range of a given preamble detector 402. In an example, there are enough preamble detectors 402 such that for at least one of the preamble detectors 402, the frequency offset between the digital sample stream and the set frequency of the preamble detector 402 is less than 100 kHz.

Figure 5:
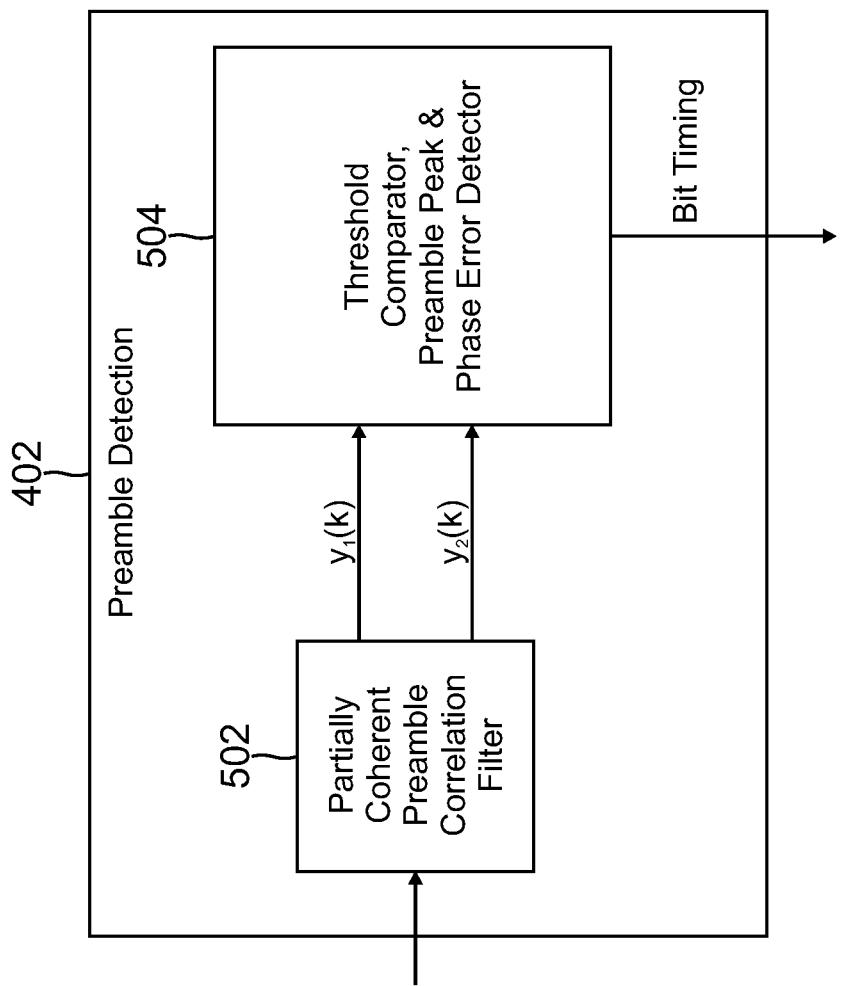
FIG. 5 is a block diagram of an example of the high level functional procedures implemented by a preamble detection module of the preamble detector of FIG. 4.

FIG. 5 is a block diagram of an example of the high level functional procedures implemented by each preamble detection module 402. A preamble detection module 402 is configured to identify the specific preamble shown in FIG. 3. That is, the preamble detection module 402 is configured to identify four pulses having the spacing shown of the signal 300. The preamble detection module 402 includes a partially coherent preamble correlation filter 502 and a threshold comparator, peak, and phase error detector 504. The correlation filter 502 operates on the digital sample stream from the RF front end 104 to produce two streams of information, labeled Y1(k) and Y2(k). The threshold comparator, peak and phase error detector 504 operates on the two streams of information, Y1(k) and Y2(k), to determine if a preamble having the expected pulses (signal 300) is detected and, if so, output timing and possibly phase information for the preamble to the bit demodulation module 116.

Figure 6:
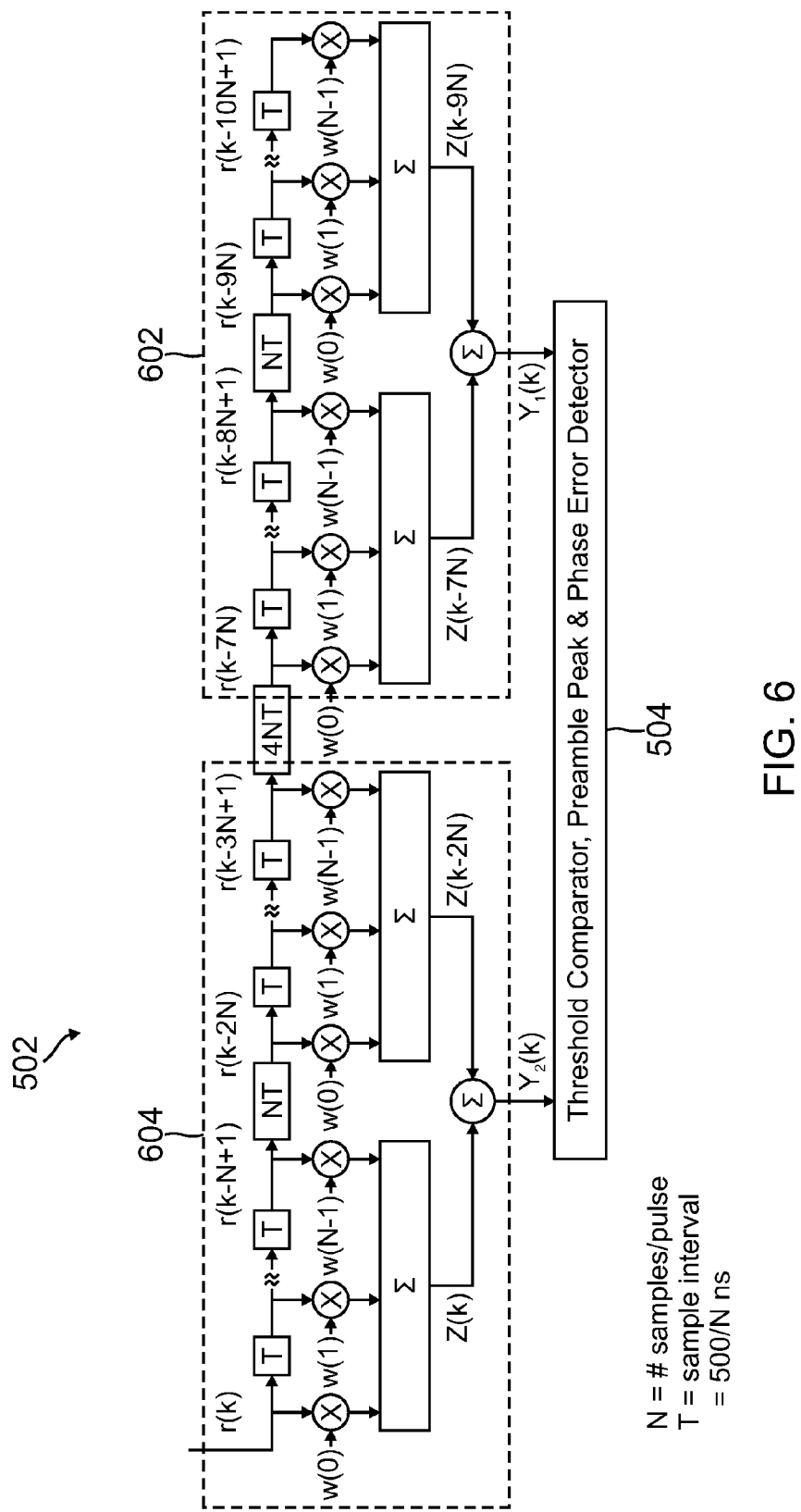
FIG. 6 is a block diagram of an example of detailed functional procedures implemented by the partially coherent preamble correlation filter of the preamble detection module of FIG. 5.

FIG. 6 is a block diagram of an example of detailed functional procedures implemented by the partially coherent preamble correlation filter 502. The correlation filter 502 is partially coherent in that the coefficients (tap-gains) of correlation filter 502 are matched to portions of the preamble. The correlation filter 502 is configured to filter the digital sample stream, r(k), with a first finite impulse response filter 602 with coefficients matched to the duration, shape (amplitude), and spacing of a first and second pulses of an expected preamble to produce a first matched filter output data stream. The correlation filter 502 is also configured to filter the digital sample stream with a cascaded second finite impulse response filter 604 with coefficients matched to the duration, shape (amplitude), and spacing of a third and fourth pulses of the expected preamble to produce a second matched filter output data stream, wherein the expected preamble 302 is shown in FIG. 3 and consists of four pulses.

In the example shown in FIG. 6 each matched filter 602, 604 produces one of the matched filter output data streams, Y1(k) and Y2(k). The first data stream Y1(k) produced by matched filter 502 is a sum of two "pulse matched filter" outputs separated by a delay equal to the spacing between the first and second pulses in preamble 302. As used herein a "pulse matched filter" refers to a finite impulse response filter having coefficients w(0)-w(N-1) that span the duration of a preamble pulse, N being the number of samples per pulse, and where the amplitudes of the coefficients match the pulse shape. The second data stream Y2(k) produced by matched filter 504 is also a sum of two pulse matched filter outputs separated by a delay equal to the spacing between the third and fourth pulses in preamble 302. There is a delay implemented between the first matched filter 602 and the second matched filter 604 that is equal to the spacing between the first and third pulses in preamble 302.

Figure 7:
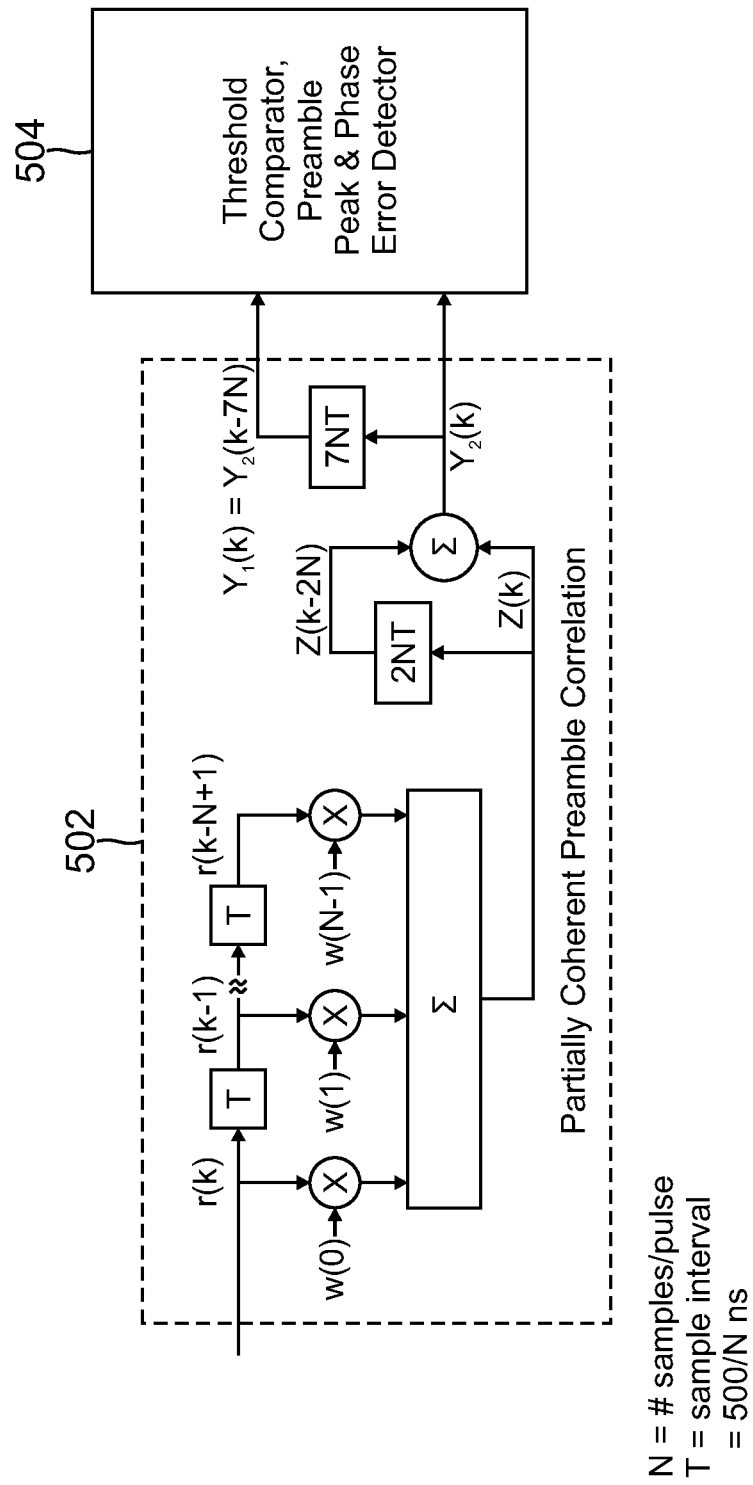
FIG. 7 is a block diagram of an example of an equivalent alternative layout for the detailed functional procedures implemented by the partially coherent preamble correlation filter of the preamble detection module of FIG. 5.

FIG. 7 is a block diagram of an example of an equivalent alternative layout for the detailed functional procedures implemented by the partially coherent preamble correlation filter 402. In this example, a single pulse width filter is used and the output, Z(k), of the single pulse width filter is summed and delayed appropriately to implement the filter(s) matched to portions of the preamble 302 and produce the two matched streams, Y1(k) and Y2(k).

As the digital sample stream, r(k), output by the 1090 MHz linear receiver front end streams through matched filters 602 and 604, the values in the matched filter output data streams, Y1(k) and Y2(k), should increase from a level corresponding to the noise floor of the receiver as the values of the digital sample stream, r(k), "line-up" with and more closely match the pulse matched filter coefficients. As a partially coherent filter 502, each matched filter 602, 604 is matched to two of the four pulses in the preamble 302. The output data streams, Y1(k) and Y2(k), will have largest magnitude when the received digital sample stream, r(k), consists of two pulses spaced by the same amount as the spacing between the first or second pair of pulses in preamble 302 provided the center frequency offset between the partially coherent preamble detector 402 and its processed digital sample stream, r(k), is zero. In this case, the outputs of the two pulse matched filters, Z(k) and Z(k−2N) or Z(k−7N) and Z(k−9N), that make up a partially coherent correlator filter will be added in-phase at some time to produce the largest correlator output peak. However, when the frequency offset between the center frequency of the partially coherent preamble detector 402 and the received digital sample stream, r(k) is ±500 kHz, a phase shift of 180 degrees results between samples spaced by the spacing between the first or second pair of pulses in preamble 302. In this case, the outputs of the two pulse matched filters, Z(k) and Z(k−2N) or Z(k−7N) and Z(k−9N), will add 180 degrees out-of-phase, that is they will cancel each other, at the time when the largest correlator output peak would be expected. Hence a valid preamble sequence would not be detectable when the frequency offset is in the order of ±500 kHz. Since the time gap between the two pulses associated with each matched filter 602, 604 is small as compared to the total duration of the preamble 302, a given frequency offset will produce a relatively smaller phase change between the first two pulses in a received preamble compared to the phase change between the first pair of pulses and the second pair of pulses. Therefore, using two separate partially matched filters 602, 604, enables the partially coherent preamble detector 502 to detect a preamble in the presence of noise over a greater range of frequency offsets than a fully coherent preamble detector which would add the outputs of the two partial matched filters 502 and 504. In fact, the partially coherent preamble correlation filter is able to detect the preamble 302 with frequency offsets as large as 200 kHz while a fully coherent preamble correlation filter that adds all 4 pulses in preamble 302 can only detect the preamble 302 when the frequency offset is less than 50 KHz. A non-coherent preamble detector may allow even more flexibility in the frequency variation and be able to detect preambles with frequency offsets as large as ±1 MHz, but would not have the sensitivity of the partially coherent filter 502 for frequency offsets less than ±200 kHz. A fully coherent filter (i.e., a single filter that is matched to all four pulses of the preamble 302) would have increased sensitivity for frequency offsets less than ±50 kHz, but would have less flexibility in frequency variation. Thus, the partially coherent filter 502 occupies a middle ground between a non-coherent filter and a fully coherent filter.

Figure 8:
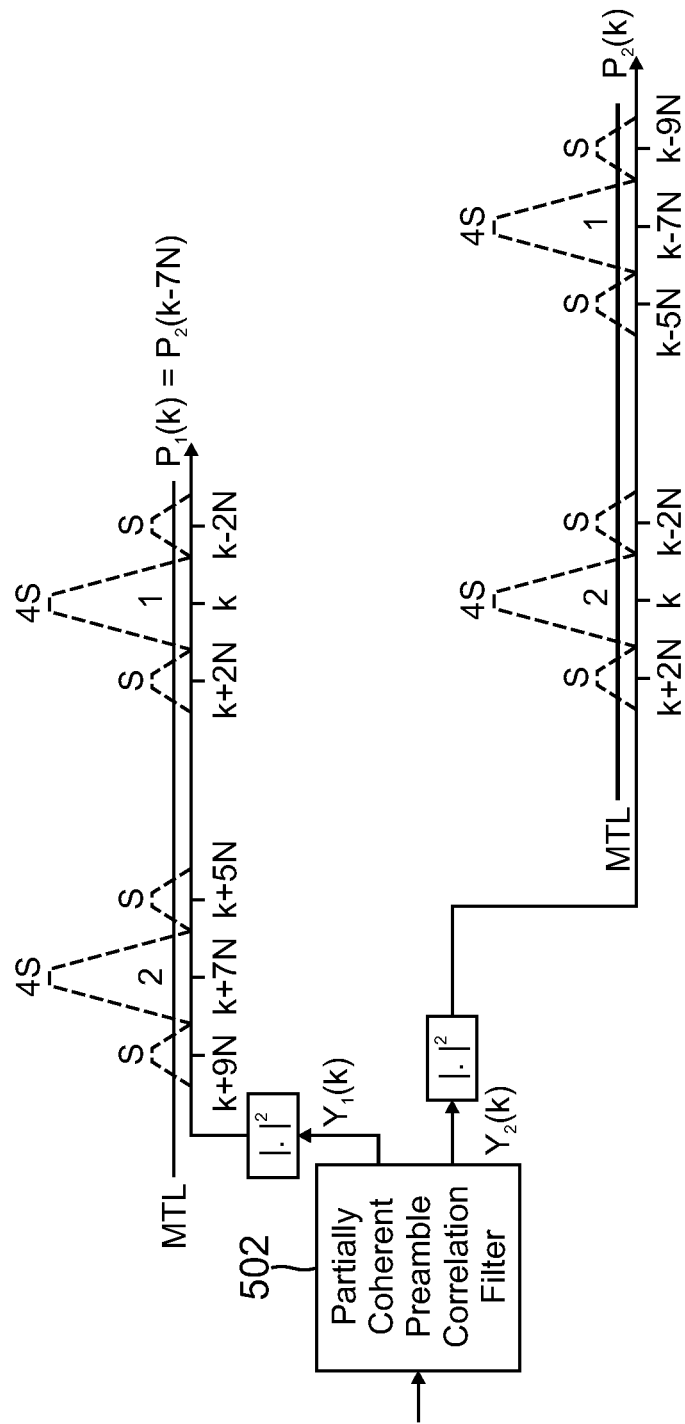
FIG. 8 is a block diagram of an example of the output streams from the partially coherent preamble correlation filter of FIGS. 6 and 7.

Y1(k) will have a peak when the first two pulses of a preamble 302 are processed, and Y2(k) will have a peak when the second two pulses of the preamble 304 are processed. Moreover, Y1(k) and Y2(k) will have peaks at the same time when the 4 pulse preamble 302 streams through the partially coherent preamble correlator 402 with a frequency offset of less than ±200 kHz as illustrated in FIG. 8. The threshold comparator, peak and phase error detector 504 can use this peak timing and a minimum trigger level (an example of which is shown as "MTL" in FIG. 8) to identify when a preamble is detected.

Figure 9:
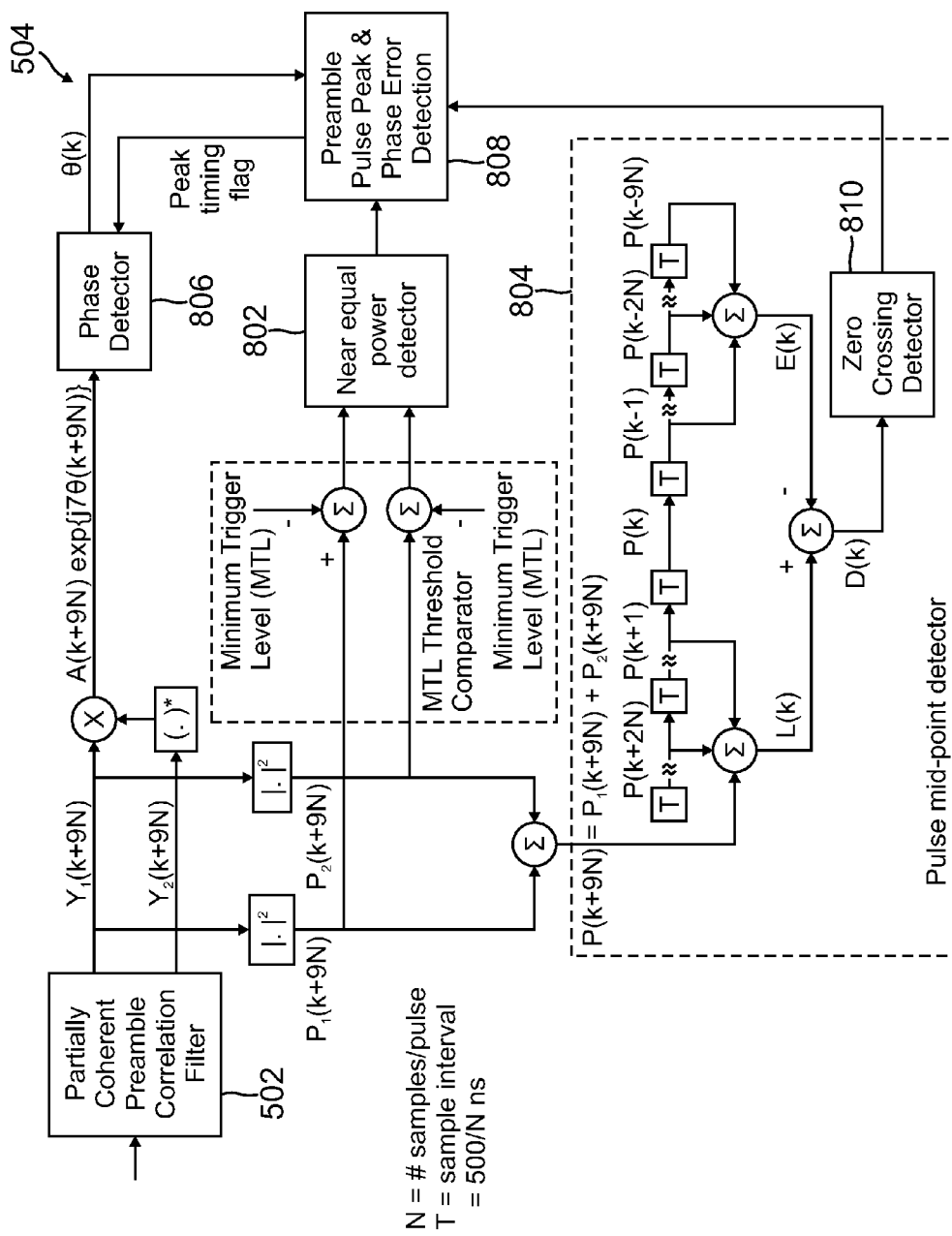
FIG. 9 is a block diagram of an example of the detailed functional procedures implemented by the threshold comparator, pulse-peak and phase error detector of the preamble detection module of FIG. 5.

FIG. 9 is a block diagram of an example of the detailed functional procedures implemented by the threshold comparator, pulse peak and phase error detector 504. The threshold comparator, pulse peak and phase error detector 504 operates on the output streams, Y1(k) and Y2(k) from the partially coherent preamble correlation filter 502 to identify when a sequence of pulses with the pre-determined spacing of preamble 302 are received. In this example, the threshold comparator, pulse peak and phase error detector 504 implements three functions, a near equal power detector 802, a pulse mid-point detector 804, and a phase detector 806. In other examples, other functions can be used to identify when a sequence of pulses matching preamble 302 has been received.

The near equal power detector 802 is configured to determine whether a peak from the P1(k)=|Y1(k)|$^2$ matched filter stream is of near equal power to a peak from the P2(k)=|Y2(k)|$^2$ matched filter stream. To assure the near equal power detector 802 operates on peaks, a minimum trigger level (MTL) is subtracted from P1(k) and P2(k) before being processed by the near equal power detector 802. The near equal power detector 802 sends a signal to the preamble pulse peak, and phase error detector 808 that indicates when P1(k) and P2(k) have near equal power and both exceed the MTL. When two pairs of pulses are received by each matched filter 602, 604 with the appropriate spacing between pulses, P1(k) and P2(k) should have nearly equal power levels at the same instant in time as illustrated in FIG. 8. That is, the near equal power detector 802 is used to assure that not only are the peaks of P1(k) and P2(k) above the minimum trigger level, but the peaks are also of about the same magnitude (power level). Thus, neither a peak from a single pulse although above the minimum trigger level nor a peak from a single pair of pulses are likely to result in peaks of P1(k) and P2(k) at the same instant in time. In an example, the near equal pulse detector 802 determines that two partially coherent correlator outputs P1(k) and P2(k) are close enough in power when they are within plus-or-minus 1 dB.

The pulse mid-point detector 804 identifies a mid-point in a sequence of pulses matching the preamble 302. The pulse mid-point detector 804 is used to assure that the preamble detection timing identified by the near equal power detector 802 corresponds to the best pulse peak timing for use by the bit demodulator 116. The pulse mid-point detector 804 sums P1(k) and P2(k) and then compares two sums, L(k) and E(k), over time of the resulting stream to identify a mid-point of a series of peaks in P1(k) and P2(k). Such a mid-point can be used to identify the best timing to use for bit demodulation and occurs when the difference D(k)=L(k)−E(k) changes from a negative value to a positive value while both P1(k) and P2(k) both exceed the MTL and have nearly equal power. The mid-point detector 804 sums the resulting stream from P1(k)+P2(k)=P(k) at times k+1, k+2, . . . , k+3N−2, k+3N−1, k+4N+1, k+4N+2, . . . , k+10N−2, k+10N−2 to produce the "late sum" data stream L(k) and separately sums the resulting stream from P1(k)+P2(k)=P(k) at times k−1, k−2, . . . , k−3N−2, k−3N−1, k−4N+1, k−4N+2, . . . , k−10N−2, k−10N−2 to produce the "early sum" data stream E(k). The mid-point detector 804 then subtracts the "early sum" from the "late sum" over time to produce the "difference" stream D(k)=L(k)−E(k). During the first half of a sequence of received preamble pulses, the sum E(k) will be greater than the sum L(k). During the last half of a sequence of received preamble pulses, the sum L(k) will be greater than the sum E(k). Thus, the mid-point detector 804 identifies the mid-point of a sequence by identifying the zero crossing at zero-crossing detector 810 of a difference stream D(k)=L(k)−E(k). A signal indicating such a zero-crossing is operated on by the preamble peak and phase error detector 808. When both a zero-crossing and near equal power have been detected the preamble peak and phase error detector 808 sends a "preamble detected" indication flag to the phase detector 806 to compute and output the phase error θ(k). Then, preamble peak and phase error detector 808 provides the "preamble detected" timing indication k=$k_{max}$, preamble peak power P($k_{max}$) and phase error θ($k_{max}$) to Preamble Detection Select module 404 for comparison with the outputs of the other parallel partially coherent preamble detectors 402. Preamble Detection selector 404 selects the "preamble detected" timing indication from the preamble detector 402 that measured the largest power level P($k_{max}$) and outputs that indication k=$k_{max}$, the frequency offset $\Delta F = m\Delta f_0$ associated with the partially coherent preamble detector and phase error $\theta(k_{max})$ to the bit demodulation module 116.

Figure 10:
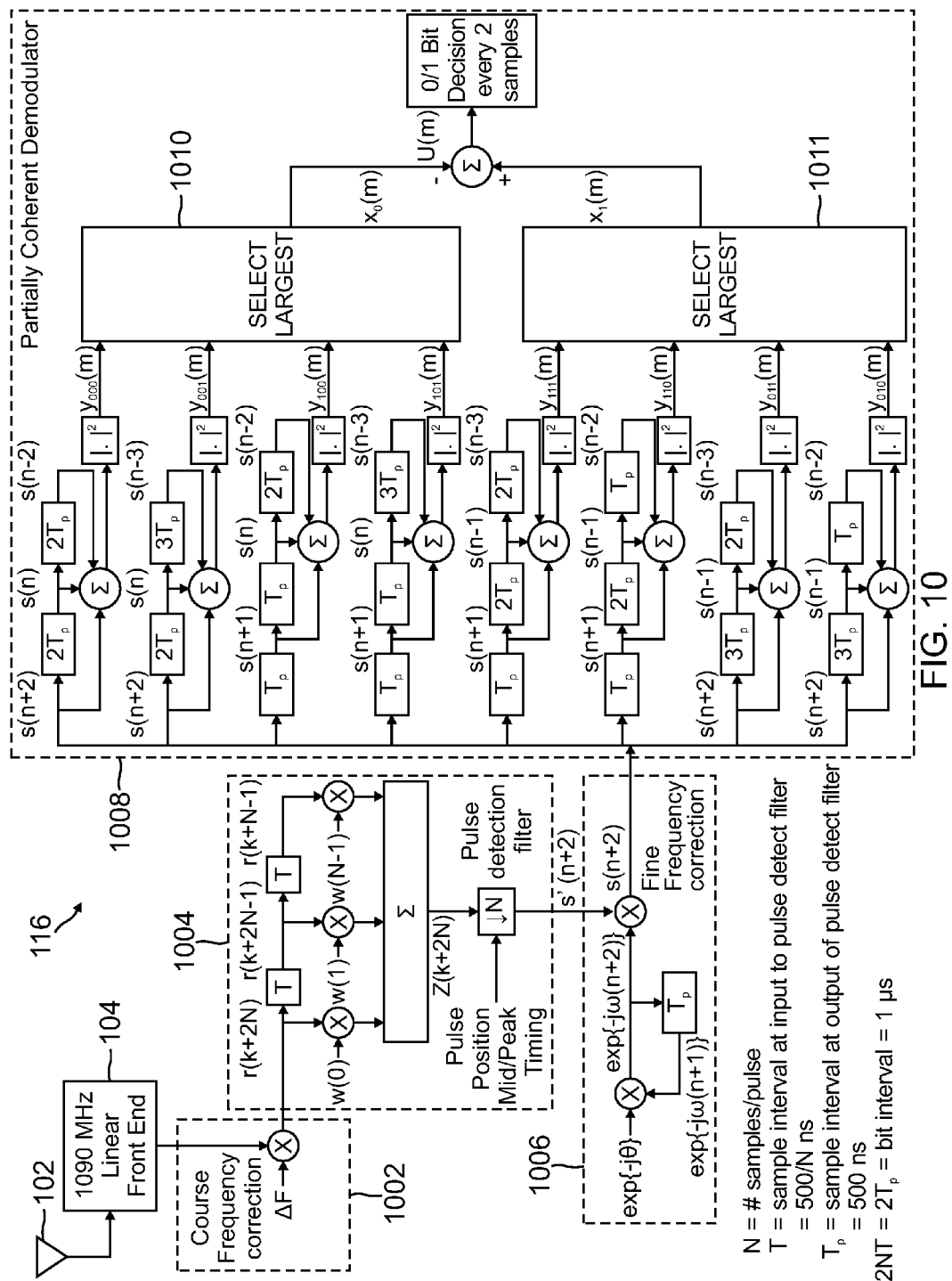
FIG. 10 is a block diagram of an example of the detailed functional procedures implemented by the bit demodulation module of the receiver of FIG. 1.

FIG. 10 is a block diagram of an example of the detailed functional procedures implemented by the bit demodulation module 116. The bit demodulation module 116 operates on the digital sample stream from the RF front end 104 to determine whether each pulse of a symbol in a message portion 304 of a pulse position modulation signal is a 0 or a 1. The bit demodulation module 116 initially performs a course frequency adjustment, $\Delta F$, at 1002. The course frequency adjustment is based on which of the multiple parallel preamble detectors 402 measured the largest power level. The frequency adjustment may be zero or up to the maximum frequency error uncertainty between the transmitted and the receiver (e.g., ±1 MHz) spanned by the parallel preamble detectors 402. In this way, the digital sample stream is adjusted in frequency and the bandwidth of the bit demodulation module 116 can be reduced to better match the bandwidth of the pulse position modulation pulses and improve sensitivity.

Once the digital sample stream has gone through the course frequency adjustment, if any, at 1002, the digital sample stream is filtered by a pulse detection filter 1004. The pulse detection may be matched to the transmitted pulse if the filter coefficients w(0), w(1), . . . , W(N−1) matched the shape of the transmitted pulse. The pulse detection filter 1004 operates over N samples of the frequency adjusted digital sample stream, r(k), spanning a pulse width and the N-sample per pulse output sample stream of the pulse detection filter Z(k) is then down sampled to 1 sample per pulse position data stream, s'(k), based on the mid-point timing provided by the preamble detector 114. This output can then, optionally, have a fine frequency adjustment, at 1006, based on the phase $\theta$ detected by the preamble detector 114. The resulting fine-frequency adjusted 1-sample pulse position data stream, s(k), is then operated on by the partially coherent demodulator 1008 to decide whether a 0-bit or a 1-bit is received in each of the pulse-position modulated bit intervals of the 112-bit message 304 shown in FIG. 3. Since the input data stream to the partially coherent demodulator consists of 1 sample per pulse position and there are two possible positions per bit interval, the input data stream to the partially coherent demodulator consists of 2 samples per bit interval. The partially coherent demodulator operates as 8 parallel matched filters, each spanning 3 bit intervals, where each of the 8 parallel matched filters is matched to a set of pulse positions for a different combination of three bits. For example, a first of the 8 parallel matched filters is matched to the pulse positions for bit sequence 000. A second of the 8 parallel matched filters is matched to the pulse positions for bit sequence 001. A third of the 8 parallel matched filters is matched to the pulse positions for bit sequence 100, and so on for each of the 8 possible combinations of three bits. Each matched filter can be configured to output a sum of the power (i.e., magnitude squared) at their respective set of pulse positions. Thus, when the received pulse positions over three sequential bit intervals match a given filter, the output from that filter will be larger than the output from filters that match only two, one, or none of the positions of three consecutive pulses. To decide whether a 0-bit or a 1-bit has been received in each bit interval, the outputs of the 8 parallel matched filters are sent to one of two selectors 1010, 1011. In each bit interval m=1, 2, . . . , 112 (i.e. every two samples), selector 1011 selects the largest output power of the 4 parallel matched filters that correspond to the 4 combinations of three bits having a 1 as the middle bit (i.e., 010, 011, 110, and 111) to provide as the selector output $x_1(m)$. Likewise, selector 1010 selects the largest output power of the 4 parallel matched filters that correspond to the 4 combinations of three bits having a 0 as the middle bit (i.e., 000, 001, 100, and 101) to provide as the selector output $x_0(m)$. The selector output from the first selector 1010 can be compared (e.g., differenced) with the selector output from the second selector 1011 to produce comparator output stream, $U(m) = x_1(m) - x_0(m)$. The selector output that is the largest corresponds to the most likely possibility for the middle bit of the three bit positions. In this way the decision block 1012 uses the output from the comparison, U(m), to determine whether the middle bit of the three symbols operates on by the demodulator 1008 corresponds to a 0 or a 1. In other examples, the demodulator 1008 can operate on different number of bits (e.g., 2, 4, 5, or 6) by having a corresponding number of matched filters grouped into two groups, each group having one of the bit positions (e.g., the middle position) the same.

The output of the bit demodulation 116 is a data stream of ones and zeros to the message decoding and processing module 118 to be further processed in any suitable manner as known to those skilled in the art.

EXAMPLE EMBODIMENTS

Example 1 includes a radio frequency (RF) receiver for pulse-position modulated signals received with unknown center frequency offset and preceded by a preamble consisting of a sequence of at least 4 pulses with known pulse spacing, the receiver comprising: a linear RF front end configured to sense a signal with a center frequency uncertainty at least equal to one half of the bandwidth of the pulses and output a digital sample stream with a sample rate greater than or equal to twice the pulse bandwidth plus maximum center frequency uncertainty based thereon; one or more processing devices; and one or more storage devices coupled to the one or more processing devices and including instructions which, when executed by the one or more processing devices, cause the one or more processing devices to detect the preamble by performing multiple preamble sequence correlations in parallel, wherein each of the multiple preamble sequence correlations operates on a version of the digital sample stream having a different frequency offset, wherein spacing between frequency offset corrections is a fraction of the bandwidth of the pulses, wherein a total sum of all the frequency offsets span a range for the center frequency uncertainty, wherein to perform each preamble sequence correlation the one or more processing devices are configured to: filter the digital sample stream with a filter having an impulse response matched to a duration and sequence of pulses in an earlier half of an expected preamble sequence to produce a first matched filter output sample stream; filter the digital sample stream with a filter having an impulse response matched to a duration and sequence of pulses in a latter half of the expected preamble sequence to produce a second matched filter output sample stream; and determine that a sequence of pulses in the signal match the expected preamble sequence based on when the first matched filter output sample stream and the second matched filter output sample stream are above a minimum trigger level at the same time.

Example 2 includes the RF receiver of Example 1, wherein filter the digital sample stream with a filter having an impulse response matched to the duration and sequence of pulses in an earlier half of an expected preamble sequence comprises a filter having a bandwidth greater than or equal to a bandwidth of a pulse; and wherein filter the digital sample stream with a filter having an impulse response matched to the duration and sequence of pulses in a latter half of the expected preamble sequence comprises a filter having a bandwidth greater than or equal to a bandwidth of a pulse.

Example 3 includes the RF receiver of any of Examples 1 or 2, wherein the instructions cause the one or more processing devices to: determine that a sequence of pulses match the expected preamble sequence based on when the first matched filter output sample stream and the second matched filter output sample stream in at least one of the multiple preamble sequence correlations have near equal power levels.

Example 4 includes the RF receiver of any of Examples 1-3, wherein the instructions cause the one or more processing devices to: determine a time in which the sequence of pulses that match the expected preamble sequence is received and use the time to demodulate a subsequent pulse-position modulated message.

Example 5 includes the RF receiver of Example 4, wherein the instructions cause the one or more processing devices to determine a time of preamble reception by: continually sum a magnitude squared of the first matched filter output sample stream with a magnitude squared of the second matched filter output sample stream to produce a combined matched filter output power stream; sum the combined matched filter output power stream over a time interval equal to a duration of preamble preceding a current output power sample to produce an early power sum; sum the combined matched filter output power stream over a time interval equal to a duration of preamble following the current output power sample to produce a late power sum; and mark a time in which the expected preamble pulse sequence is received as the time in which the difference between the late power sum and the early power sum changes from a negative value to a positive value while the first matched filter output sample stream and the second matched filter output sample stream are above the minimum trigger level and the first matched filter output sample stream and the second matched filter sample stream have near equal levels.

Example 6 includes the RF receiver of any of Examples 1-5, wherein the instructions cause the one or more processing devices to: determine a phase difference between the second matched filter output sample stream and the second matched filter output sample stream at the time of preamble reception.

Example 7 includes the RF receiver of any of Examples 1-6, wherein when more than one of the multiple preamble correlations, at the same time, determines that a sequence of pulses in the pulse position modulated signal match the expected preamble sequence, the instructions cause the one or more processing devices to: select a frequency shift from the more than one multiple preamble correlations that received the largest power level; and use the frequency shift from the selected multiple preamble correlations to demodulate a subsequent message.

Example 8 includes the RF receiver of Example 7, wherein the instructions cause the one or more processing devices to: demodulate a subsequent message of the preamble by: filter the digital sample stream with a plurality of parallel filters, each of the parallel filters matched to set of pulse positions for a different combination of three bits; select from four of the plurality of parallel filters matched to a middle bit position of 0, a first filter output having the largest power level; select from four of the plurality of parallel filters matched to a middle bit position of 1, a second filter output having the largest power level; compare the first filter output and the second filter output; and if the first filter output has a larger power level than the second filter output, output a 0 as the bit value for the middle bit position, if the second filter output has a larger power level than the first filter output, output a 1 as the bit value for the middle bit position.

Example 9 includes the RF receiver of Example 8, wherein demodulate the subsequent message includes adjusting a frequency offset of the digital sample stream corresponding to the frequency shift selected from the multiple preamble sequence detectors that detected a preamble with the highest power.

Example 10 includes the RF receiver of any of Examples 8 or 9, wherein demodulate the subsequent message includes filter the digital sample stream by a filter with impulse response matching a duration of a pulse, decimating an output of the filter to produce one output sample per pulse and further adjusting a center frequency of the decimated output sample stream using the phase difference determined at the time of preamble reception.

Example 11 includes a method of receiving pulse-position modulated signals with unknown center frequency offset and preceded by a preamble consisting of at least 4 pulses with known pulse spacing, the method comprising: generating a digital sample stream from a signal sensed at an antenna, wherein the digital sample stream has a sample rate greater than or equal to twice a bandwidth of an expected pulse plus maximum center frequency uncertainty; performing multiple preamble sequence correlations in parallel, wherein each of the multiple preamble sequence correlations operates on a version of the digital sample stream having a different frequency offset, wherein spacing between frequency offsets is a fraction of the bandwidth of an expected pulse, wherein a total of all the frequency offsets span a range for the center frequency uncertainty, wherein each preamble sequence correlation includes: filtering the digital sample stream with a filter having an impulse response matched to a duration and sequence of pulses in an earlier half of an expected preamble sequence to produce a first matched filter output sample stream; filter the digital sample stream with a filter having an impulse response matched to a duration and sequence of pulses in a latter half of the expected preamble sequence to produce a second matched filter output sample stream; and determine that a sequence of pulses in the received signal match the expected preamble sequence based on when the first matched filter output sample stream and the second matched filter output sample stream are above a minimum trigger level at the same time.

Example 12 includes the method of Example 11, wherein filtering the digital sample stream with a filter having an impulse response matched to the duration and sequence of pulses in an earlier half of an expected preamble sequence comprises filtering with a bandwidth greater than or equal to a bandwidth of a pulse; and wherein filtering the digital sample stream with a filter having an impulse response matched to the duration and sequence of pulses in the second half of the expected preamble sequence comprises filtering with a bandwidth greater than or equal to a bandwidth of a pulse.

Example 13 includes the method of any of Examples 11 or 12, comprising: determining that a sequence of pulses match the expected preamble sequence based on when the first matched filter output sample stream and the second matched filter output sample stream in at least one of the multiple preamble sequence correlations have near equal power levels.

Example 14 includes the method of any of Examples 11-13, comprising: determining a time in which the sequence of pulses that match the expected preamble sequence is received; and using the time to demodulate a subsequent pulse-position modulated message.

Example 15 includes the method of Example 14, wherein determining a time includes: continually summing a magnitude squared of the first matched filter output sample stream with a magnitude squared of the second matched filter output sample stream to produce a combined matched filter output power stream; summing the combined matched filter output power stream over a time interval equal to a duration of preamble preceding a current output power sample to produce an early power sum; summing the combined matched filter output power stream over a time interval equal to a duration of preamble following the current output power sample to produce a late power sum; marking a time in which the expected preamble pulse sequence is received as the time in which the difference between the late power sum and the early power sum changes from a negative value to a positive value while the first matched filter output sample stream and the second matched filter output sample stream are above the minimum trigger level and the first matched filter output sample stream and the second matched filter sample stream have near equal levels.

Example 16 includes the method of any of Examples 11-15, comprising: determining a phase difference between the second matched filter output sample stream and the second matched filter output sample stream at the time of preamble reception.

Example 17 includes the method of any of Examples 11-16, wherein when more than one of the multiple preamble correlations, at the same time, determines that a sequence of pulses in the pulse position modulated signal match the expected preamble sequence, the method includes: selecting a frequency shift from the more than one multiple preamble correlations that received the largest power level; and using the frequency shift from the selected multiple preamble correlations to demodulate a subsequent message.

Example 18 includes the method of Example 17, comprising: demodulating a subsequent message of the preamble by: filtering the digital sample stream with a plurality of parallel filters, each of the parallel filters matched to set of pulse positions for a different combination of three bits; selecting from four of the plurality of parallel filters matched to a middle bit position of 0, a first filter output having the largest power level; selecting from four of the plurality of parallel filters matched to a middle bit position of 1, a second filter output having the largest power level; comparing the first filter output and the second filter output; and if the first filter output has a larger power level than the second filter output, outputting a 0 as the bit value for the middle bit position, if the second filter output has a larger power level than the first filter outputting, output a 1 as the bit value for the middle bit position.

Example 19 includes the method of Example 18, wherein demodulate the subsequent message includes adjusting a frequency offset of the digital sample stream corresponding to the frequency shift selected from the multiple preamble sequence detectors that detected a preamble with the highest power.

Example 20 includes a radio frequency (RF) receiver for pulse-position modulated signals, the receiver comprising: a linear RF front end configured to sense a pulse-position modulated signal and output a digital sample stream based thereon; one or more processing devices; and one or more storage devices coupled to the one or more processing devices and including instructions which, when executed by the one or more processing devices, cause the one or more processing devices to detect the preamble by performing multiple preamble sequence correlations in parallel, wherein each of the multiple preamble sequence correlations operates on a version of the digital sample stream having a different frequency offset, wherein to perform each preamble sequence correlation the one or more processing devices are configured to: filter the digital sample stream with a filter having an impulse response matched to a duration and sequence of pulses in an earlier half of an expected preamble sequence to produce a first matched filter output sample stream; filter the digital sample stream with a filter having an impulse response matched to a duration and sequence of pulses in a latter half of the expected preamble sequence to produce a second matched filter output sample stream; and determine that a sequence of pulses in the signal match the expected preamble when, at the same time, the first matched filter output sample stream and the second matched filter output sample stream are above a minimum trigger level and the first matched filter output sample stream and the second matched filter output sample stream have near equal energy levels

What is claimed is:

1. A radio frequency (RF) receiver for a pulse-position modulated signal received with unknown center frequency offset and preceded by a preamble consisting of a sequence of at least 4 pulses with known pulse spacing, the receiver comprising:
a linear RF front end configured to sense a signal with a center frequency uncertainty at least equal to one half of the bandwidth of the pulses and output a digital sample stream with a sample rate greater than or equal to twice the pulse bandwidth plus maximum center frequency uncertainty based thereon;
one or more processing devices; and
one or more storage devices coupled to the one or more processing devices and including instructions which, when executed by the one or more processing devices, cause the one or more processing devices to detect the preamble by performing multiple preamble sequence correlations in parallel, wherein each of the multiple preamble sequence correlations operates on a version of the digital sample stream having a different frequency offset, wherein spacing between frequency offset corrections is a fraction of the bandwidth of the pulses, wherein a total sum of all the frequency offsets span a range for the center frequency uncertainty, wherein to perform each preamble sequence correlation the one or more processing devices are configured to:
filter the digital sample stream with a filter having an impulse response matched to a duration and sequence of pulses in an earlier half of an expected preamble sequence to produce a first matched filter output sample stream;
filter the digital sample stream with a filter having an impulse response matched to a duration and sequence of pulses in a latter half of the expected preamble sequence to produce a second matched filter output sample stream; and
determine that a sequence of pulses in the signal match the expected preamble sequence based on when the first matched filter output sample stream and the second matched filter output sample stream are above a minimum trigger level at the same time.

2. The RF receiver of claim 1, wherein filter the digital sample stream with a filter having an impulse response matched to the duration and sequence of pulses in an earlier half of an expected preamble sequence comprises a filter having a bandwidth greater than or equal to a bandwidth of a pulse; and
wherein filter the digital sample stream with a filter having an impulse response matched to the duration and sequence of pulses in a latter half of the expected preamble sequence comprises a filter having a bandwidth greater than or equal to a bandwidth of a pulse.

3. The RF receiver of claim 1, wherein the instructions cause the one or more processing devices to:
determine that a sequence of pulses match the expected preamble sequence based on when the first matched filter output sample stream and the second matched filter output sample stream in at least one of the multiple preamble sequence correlations have near equal power levels.

4. The RF receiver of claim 1, wherein the instructions cause the one or more processing devices to:
determine a time in which the sequence of pulses that match the expected preamble sequence is received and use the time to demodulate a subsequent pulse-position modulated message.

5. The RF receiver of claim 4, wherein the instructions cause the one or more processing devices to determine a time of preamble reception by:
continually sum a magnitude squared of the first matched filter output sample stream with a magnitude squared of the second matched filter output sample stream to produce a combined matched filter output power stream;
sum the combined matched filter output power stream over a time interval equal to a duration of preamble preceding a current output power sample to produce an early power sum;
sum the combined matched filter output power stream over a time interval equal to a duration of preamble following the current output power sample to produce a late power sum; and
mark a time in which the expected preamble pulse sequence is received as the time in which the difference between the late power sum and the early power sum changes from a negative value to a positive value while the first matched filter output sample stream and the second matched filter output sample stream are above the minimum trigger level and the first matched filter output sample stream and the second matched filter sample stream have near equal levels.

6. The RF receiver of claim 1, wherein the instructions cause the one or more processing devices to:
determine a phase difference between the second matched filter output sample stream and the second matched filter output sample stream at the time of preamble reception.

7. The RF receiver of claim 1, wherein when more than one of the multiple preamble correlations, at the same time, determines that a sequence of pulses in the pulse position modulated signal match the expected preamble sequence, the instructions cause the one or more processing devices to:
select a frequency shift from the more than one multiple preamble correlations that received the largest power level; and
use the frequency shift from the selected multiple preamble correlations to demodulate a subsequent message.

8. The RF receiver of claim 7, wherein the instructions cause the one or more processing devices to:
demodulate a subsequent message of the preamble by:
filter the digital sample stream with a plurality of parallel filters, each of the parallel filters matched to set of pulse positions for a different combination of three bits;
select from four of the plurality of parallel filters matched to a middle bit position of 0, a first filter output having the largest power level;
select from four of the plurality of parallel filters matched to a middle bit position of 1, a second filter output having the largest power level;
compare the first filter output and the second filter output; and
if the first filter output has a larger power level than the second filter output, output a 0 as the bit value for the middle bit position, if the second filter output has a larger power level than the first filter output, output a 1 as the bit value for the middle bit position.

9. The RF receiver of claim 8, wherein demodulate the subsequent message includes adjusting a frequency offset of the digital sample stream corresponding to the frequency shift selected from the multiple preamble sequence detectors that detected a preamble with the highest power.

10. The RF receiver of claim 8, wherein demodulate the subsequent message includes filter the digital sample stream by a filter with impulse response matching a duration of a pulse, decimating an output of the filter to produce one output sample per pulse and further adjusting a center frequency of the decimated output sample stream using the phase difference determined at the time of preamble reception.

11. The RF receiver of claim 1, wherein the pulse-position modulated signal received with unknown center frequency offset comprises a signal transmitted with a 1090 MHz ADS-B transmitter and wherein the preamble consisting of a sequence of at least 4 pulses with known pulse spacing comprises 4 pulses having spacing that conforms to an ADS-B protocol.

12. A method of receiving a pulse-position modulated signal with unknown center frequency offset and preceded by a preamble consisting of at least 4 pulses with known pulse spacing, the method comprising:
generating a digital sample stream from a signal sensed at an antenna, wherein the digital sample stream has a sample rate greater than or equal to twice a bandwidth of an expected pulse plus maximum center frequency uncertainty;
performing multiple preamble sequence correlations in parallel, wherein each of the multiple preamble sequence correlations operates on a version of the digital sample stream having a different frequency offset, wherein spacing between frequency offsets is a fraction of the bandwidth of an expected pulse, wherein a total of all the frequency offsets span a range for the center frequency uncertainty, wherein each preamble sequence correlation includes:
filtering the digital sample stream with a filter having an impulse response matched to a duration and sequence of pulses in an earlier half of an expected preamble sequence to produce a first matched filter output sample stream;
filter the digital sample stream with a filter having an impulse response matched to a duration and sequence of pulses in a latter half of the expected preamble sequence to produce a second matched filter output sample stream; and
determine that a sequence of pulses in the received signal match the expected preamble sequence based on when the first matched filter output sample stream and the second matched filter output sample stream are above a minimum trigger level at the same time.

13. The method of claim 12, comprising:
determining that a sequence of pulses match the expected preamble sequence based on when the first matched filter output sample stream and the second matched filter output sample stream in at least one of the multiple preamble sequence correlations have near equal power levels.

14. The method of claim 12, comprising:
    determining a time in which the sequence of pulses that match the expected preamble sequence is received; and
    using the time to demodulate a subsequent pulse-position modulated message.

15. The method of claim 14, wherein determining a time includes:
    continually summing a magnitude squared of the first matched filter output sample stream with a magnitude squared of the second matched filter output sample stream to produce a combined matched filter output power stream;
    summing the combined matched filter output power stream over a time interval equal to a duration of preamble preceding a current output power sample to produce an early power sum;
    summing the combined matched filter output power stream over a time interval equal to a duration of preamble following the current output power sample to produce a late power sum;
    marking a time in which the expected preamble pulse sequence is received as the time in which the difference between the late power sum and the early power sum changes from a negative value to a positive value while the first matched filter output sample stream and the second matched filter output sample stream are above the minimum trigger level and the first matched filter output sample stream and the second matched filter sample stream have near equal levels.

16. The method of claim 12, wherein when more than one of the multiple preamble correlations, at the same time, determines that a sequence of pulses in the pulse position modulated signal match the expected preamble sequence, the method includes:
    selecting a frequency shift from the more than one multiple preamble correlations that received the largest power level; and
    using the frequency shift from the selected multiple preamble correlations to demodulate a subsequent message.

17. The method of claim 16, comprising:
    demodulating a subsequent message of the preamble by:
        filtering the digital sample stream with a plurality of parallel filters, each of the parallel filters matched to set of pulse positions for a different combination of three bits;
        selecting from four of the plurality of parallel filters matched to a middle bit position of 0, a first filter output having the largest power level;
        selecting from four of the plurality of parallel filters matched to a middle bit position of 1, a second filter output having the largest power level;
        comparing the first filter output and the second filter output; and
    if the first filter output has a larger power level than the second filter output, outputting a 0 as the bit value for the middle bit position, if the second filter output has a larger power level than the first filter outputting, output a 1 as the bit value for the middle bit position.

18. The method of claim 17, wherein demodulate the subsequent message includes adjusting a frequency offset of the digital sample stream corresponding to the frequency shift selected from the multiple preamble sequence detectors that detected a preamble with the highest power.

19. The method of claim 12, wherein the pulse-position modulated signal with unknown center frequency offset comprises a signal transmitted with a 1090 MHz ADS-B transmitter and wherein the preamble consisting of a sequence of at least 4 pulses with known pulse spacing comprises 4 pulses having spacing that conforms to an ADS-B protocol.

20. An ADS-B radio frequency (RF) receiver for a pulse-position modulated signal transmitted with a 1090 MHz ADS-B transmitter, the pulse-position modulated signal preceded by a preamble consisting of 4 pulses having spacing that conforms to an ADS-B protocol, the receiver comprising:
    a linear RF front end configured to sense a pulse-position modulated signal and output a digital sample stream based thereon;
    one or more processing devices; and
    one or more storage devices coupled to the one or more processing devices and including instructions which, when executed by the one or more processing devices, cause the one or more processing devices to detect the preamble by performing multiple preamble sequence correlations in parallel, wherein each of the multiple preamble sequence correlations operates on a version of the digital sample stream having a different frequency offset, wherein to perform each preamble sequence correlation the one or more processing devices are configured to:
        filter the digital sample stream with a filter having an impulse response matched to a duration and sequence of pulses in an earlier half of an expected preamble sequence to produce a first matched filter output sample stream;
        filter the digital sample stream with a filter having an impulse response matched to a duration and sequence of pulses in a latter half of the expected preamble sequence to produce a second matched filter output sample stream; and
        determine that a sequence of pulses in the signal match the expected preamble when, at the same time, the first matched filter output sample stream and the second matched filter output stream are above a minimum trigger level and the first matched filter output sample stream and the second matched filter output sample stream have near equal energy levels.

* * * * *